Patented Dec. 26, 1933

1,941,349

UNITED STATES PATENT OFFICE 1,941,349

MANUFACTURE OF VEGETABLE CONDENSATION PRODUCTS

Adolf Hawerlander, St. Joseph, Mo., assignor to Albert D. Stewart, St. Joseph, M.; Hazel Stewart administratrix of said Albert D. Stewart, deceased No Drawing. Application May 27, 1932
Serial No. 614,030

14 Claims. (Cl. 260—3)

This invention relates broadly to the manufacture of vegetable condensation products and refers more particularly to the manufacture of soluble or insoluble, fusible or infusible vegetable condensation products from the non-fibrous pectous substances naturally associated with fibrous pecto-cellulosic plant material.

According to Edwin Sutermeister, in Chemistry of Pulp and Paper Making, among the more important pecto-celluloses are flax and such other non-lignified fibers as ramie, hemp, nettle-fibres, sisal and those derived from whole stems such as straws, esparto, corn stalks, bagasse, bamboo, cotton stalks, and asparagus.

It has been proposed to process fibrous vegetable material such as cereal straw, flax, hemp, corn stalks and the like in the presence of a solvent such as water, steam or the like, whereby to loosen and dissolve the non-fibrous pectous constituents naturally associated with fibrous pectous material and thereafter separate the solution from the fibrous components by pressure. The solvent in the solution may then be evaporated by simple distillation to leave a non-fibrous pectous residue, consisting of a heavy, viscous, dark brown mass having a consistency similar to heavy molasses. If left exposed to the atmosphere the residue shows no marked change over a period of months. If subjected to a temperature at which all of the volatile material is evaporated, a residue will be left consisting of a porous, carbonaceous material characterized by fusibility and slow solubility. This carbonaceous residue if reduced to comminuted condition and heated has the characteristics of a thermo plastic material, and since it is fusible, re-heating will make it soft and plastic. The heavy, viscous, dark brown residue remaining after evaporation of water is the material with which the present invention is concerned and will be referred to in the following specification as the unreacted pectous residue.

Pectose, fat, wax, coloring matters, tannin, group together in this pectous residue, the chemical nature of which is at present uncertain. Pectose differs from lignin, also called "black liquor" and which is the residue from ligno-cellulose such as wood, insofar as pectose is soluble in weak alkaline solutions at temperatures around 100 degrees C., while lignin does not dissolve in weak alkaline solutions below 130 degrees C.

It is an object of the present invention to process this pectous residue to produce a number of products useful in the arts as will be hereinafter explained. By proper regulation of the process it is possible to produce a product which is soluble or insoluble, fusible or infusible.

In its broad concept, the invention is applicable to the treatment of the non-fibrous constituents of all kinds of fibrous pectous-cellulosic vegetable material, and in one specific aspect the invention is directed to the utilization of the non-fibrous residue naturally associated with cereal straw such as oats, barley, wheat, rye, rice and more particularly wheat straw.

Briefly, the present invention comprises reacting the unreacted pectous residue in the presence of formaldehyde and a condensing agent under such conditions as to initiate an exothermic reaction which is allowed to continue until the temperature of the mass has been raised to the point where the mass is still fusible. Upon attaining this temperature the reaction is interrupted and the mass is cooled to a temperature of below, say 30° C. This product, which will be referred to for convenience as an intermediate condensation product, is a thinly viscous material, soluble in water or other volatile solvents which, if allowed to stand exposed to the atmosphere, will become insoluble by solidification but the solid product still retains properties of fusibility.

This intermediate condensation product can be converted into an infusible, insoluble final condensation product by subjecting it to a slow heat, to a temperature of approximately 100° C., at which time it has been converted from a fusible, soluble material into a solid, infusible, insoluble final condensation product. If, during the conversion from fusible to infusible condition, the material is retained in a mold, molded articles of desired shape or configuration can be produced.

Fillers such as fibers, minerals and other well known fillers may be incorporated with the intermediate condensation product which would, of course, add considerably to the strength of the final product. The viscous, fusible, intermediate product may be used as a saturant for fibers or fabrics, in which event the saturated mass would be subjected to slow heating up to, say 150° C., simultaneously with the application of pressure to produce a hard board product. If the intermediate condensation product is too viscous to permit an efficient saturation, it may be diluted with a solvent such as water or other volatile solvent in the proportion necessary.

One of the features of the invention which should be noted is that by regulation of the amount of condensing agent used, the reaction can be controlled and a product of any predetermined shade or color may be obtained. The condensing agent functions to accelerate the reaction, therefore, if a large amount of condensing agent is initially incorporated in the mixture the reaction will proceed very quickly with the result that a dark colored product will be secured whereas if the condensing agent is added to the reaction mixture successively in small increments, the reaction will proceed slowly resulting in a product of much lighter color. The following is an illustrative example of one specific embodiment of the present invention.

Fifty parts by volume of the unreacted residue and fifty parts by volume of 40% formaldehyde may be poured into a container and thoroughly shaken until a thorough solution has been obtained. This solution is slowly raised in temperature preferably by external application of heat to a temperature of preferably around 30° C., at which time a small amount of a condensing agent such as sodium sulphite is introduced into the mixture. Initially the amount of condensing agent introduced to the solution may comprise preferably constituents of a small portion of one part by volume relative to the mixture.

The introduction of the condensing agent initiates an exothermic reaction which continues without the application of any additional external heat. The further application of external heat is stopped since the exothermic reaction established by the condensing agent will continue and serve to increase the temperature of the reacting mass. Additional amounts of condensing agent are successively introduced in small increments over a period of about an hour, more or less, until a total of approximately 1% by volume of condensing agent relative to the solution of unreacted residue and formaldehyde has been incorporated. Care should be taken not to introduce the condensing agent too rapidly as it is desirable in most instances that the reaction proceed slowly.

The exothermic reaction continuing in the mass will raise the temperature and when the temperature has reached approximately 70° C., the reaction is interrupted and stopped by subjecting the mass to a cooling action to reduce the temperature thereof below 30° C. and preferably between 20 and 25° C. This cooling may be accelerated by circulating a cooling medium in indirect contact with the mass, as for instance, through water jacket or the like. During the reacting period the mass should be subjected to a violent agitation as, for instance, by means of a rotating paddle or vibration of the vessel containing the mixture.

This cooled product is fusible and soluble in water and other volatile solvents. If left exposed to the atmosphere the interrupted reaction will be resumed and the product will be converted within a period of one or two hours to two or three days, depending on weather conditions, into a solid product still fusible but insoluble. This intermediate condensation product is now ready to be converted into its final, infusible insoluble state.

I will now describe the use of the intermediate product in the manufacture and production of a number of useful products but it is to be understood that the uses named are merely illustrative and are not to be construed as limiting the use of the product.

In the manufacture of a hard board, for instance, the fusible, intermediate condensation product may be used as a saturant for fabric or fibrous stock. If too viscous to permit satisfactory impregnation it may be dissolved in water or other suitable volatile solvent. The saturated fibrous mass is subjected to a heat from 100 to 150° C. and a pressure of 500 to 5,000 pounds per square inch, more or less, to convert the intermediate condensation product into an infusible, insoluble final condensation product. The board thus produced is infusible, insoluble, relatively rigid, waterproof, fire-resistant and odorless. The fibers may be either vegetable fibers or mineral fibers, the latter including asbestos, rock wool, or the like.

It is to be understood that by the saturating treatment I include either previously felted or woven fibers or fabric bases as well as unfelted fibers.

Instead of a fabric or fibrous filler, such fillers as whiting, clays, pumice stone or other minerals capable of imparting strength to the final product may be introduced, or the intermediate reaction product may be converted from its intermediate state to its final infusible, insoluble state without the incorporation of any filter in which event the temperature during the conversion step would be approximately the same.

In the foregoing illustrative example I specifically name sodium sulphite as the condensing agent. It is to be understood that I do not wish to be limited to any condensing agent as I may use any alkaline, acid or base capable of producing the exothermic action desired.

It has been found that the color of this new indurating material may vary from jet black to pure white depending upon the time allowed for the condensation to take place. Also the hardness and density may be controlled by the temperature at which the reaction or condensation takes place and the amount of condensing agent introduced.

In the illustrative example I have specified fifty parts of unreacted residue with fifty parts of formaldehyde and one part of condensing agent. It is obvious that these proportions are merely illustrative and may be varied widely. The function of the condensing agent is not to react with the aldehyde or the unreacted residue to make a new chemical, but rather to create a chemical heat to cause the reaction between the aldehyde and unreacted residue while the entire mass is agitated. Therefore, it may be desirable in some instances to eliminate the condensing agent and apply external heat to the mixture while it is being agitated, or the external heat may be used as an adjunct to the condensing agent.

The temperature of the reacting mass must be controlled so that the maximum temperature which the mass is permitted to attain is 80° C.

I claim as my invention:

1. A process of manufacturing vegetable condensation products, which comprises reacting an unreacted non-fibrous pectous residue derived from pecto-cellulosic plant material with an aldehyde while subjecting the mixture to agitation and while raising the temperature thereof, checking the reaction before infusible, insoluble compounds are formed and recovering a fusible, soluble, intermediate condensation product.

2. A process of manufacturing vegetable condensation products, which comprises reacting an unreacted non-fibrous pectous residue derived from pecto-cellulosic plant material with an aldehyde while subjecting the mixture to agitation and while raising the temperature thereof, checking the reaction before infusible, insoluble compounds are formed, recovering a fusible, soluble, intermediate condensation product, and converting said intermediate condensation product into a final infusible, insoluble condensation product by the application of heat.

3. A process of manufacturing vegetable condensation products, which comprises reacting unreacted non-fibrous pectous residue derived from pecto-cellulosic plant material in the presence of formaldehyde and a condensing agent while subjecting the mixture to agitation and heat, controlling the temperature of the reacting mass to prevent the temperature rising sufficiently high to produce insoluble, infusible compounds, checking the reaction and recovering a fusible, soluble, intermediate reaction product.

4. A process of manufacturing vegetable condensation products, which comprises reacting unreacted non-fibrous pectous residue derived from pecto-cellulosic plant material in the presence of formaldehyde and a condensing agent while subjecting the mixture to agitation and heat, controlling the temperature of the reacting mass to prevent the temperature rising sufficiently high to produce insoluble, infusible compounds, interrupting the reaction and recovering a fusible, soluble, intermediate reaction product, and converting said fusible, intermediate reaction product into a final insoluble, infusible product by the application of heat.

5. A process of manufacturing vegetable condensation products, which comprises reacting non-fibrous pectous residue derived from pecto-cellulosic plant material in the presence of formaldehyde and a condensing agent while subjecting the mixture to agitation and heat, controlling the temperature of the reacting mass whereby the maximum temperature which the mass is permitted to attain is 80° C., checking the reaction by chilling the reacting mass to a non-cracking temperature, and recovering a fusible, soluble, intermediate reaction product.

6. A process of manufacturing vegetable condensation products, which comprises reacting non-fibrous pectous residue derived from pecto-cellulosic plant material in the presence of formaldehyde and a condensing agent while subjecting the mixture to agitation and heat, controlling the temperature of the reacting mass whereby the maximum temperature which the mass is permitted to attain is 80° C., checking the reaction by chilling the reacting mass to a temperature below 30° C., and recovering a fusible, soluble, intermediate reaction product.

7. A process of manufacturing vegetable condensation products, which comprises mixing an unreacted, non-fibrous pectous residue derived from pecto-cellulosic plant material with an aldehyde, initiating reaction thereof by external heat, incorporating a condensing agent successively in small increments with the reacting mass in such amounts and at such a rate as to produce an exothermic reaction, checking the application of external heat, checking the reaction before infusible, insoluble compounds are formed, and recovering a fusible, soluble, intermediate condensation product.

8. A process of manufacturing vegetable condensation products, which comprises mixing an unreacted, non-fibrous pectous residue derived from pecto-cellulosic plant material with an aldehyde, initiating reaction thereof by external heat, incorporating a condensing agent successively in small increments with the reacting mass in such amounts and at such a rate as to produce an exothermic reaction, checking the application of external heat, checking the reaction before infusible, insoluble compounds are formed, recovering a fusible, soluble, intermediate condensation product and converting said intermediate condensation product into a final, infusible, insoluble condensation product by the application of heat.

9. A process of manufacturing vegetable condensation products, which comprises reacting an unreacted non-fibrous pectous residue derived from pecto-cellulosic plant material with an aldehyde while subjecting the mixture to agitation and while raising the temperature thereof, checking the reaction before infusible, insoluble compounds are formed, recovering a fusible, soluble, intermediate condensation product, and converting said intermediate condensation product into a final infusible, insoluble condensation product by the application of heat and pressure.

10. A process of manufacturing vegetable condensation products, which comprises reacting unreacted non-fibrous pectous residue derived from pecto-cellulosic plant material in the presence of formaldehyde and a condensing agent while subjecting the mixture to agitation and heat, controlling the temperature of the reacting mass to prevent the temperature rising sufficiently high to produce insoluble, infusible compounds, interrupting the reaction and recovering a fusible, soluble, intermediate reaction product, converting said fusible, intermediate reaction product into a final insoluble, infusible product by the application of heat and pressure.

11. A vegetable condensation product resulting from the reaction of unreacted non-fibrous pectous residue derived from pecto-cellulosic plant material with an aldehyde, characterized by fusibility and solubility, and further characterized by loss of solubility on solidification by exposure to the atmosphere.

12. A product resulting from the reaction of an unreacted non-fibrous pectous residue derived from pecto-cellulosic plant material with an aldehyde, characterized by being infusible, insoluble, fire-resistant and odorless.

13. A product resulting from the reaction of a pectous non-fibrous cereal straw residue with an aldehyde, characterized by being infusible, insoluble, fire-resistant and odorless.

14. A product resulting from the reaction of a pectous non-fibrous wheat straw residue with an aldehyde, characterized by being infusible, insoluble, fire-resistant and odorless.

ADOLF HAWERLANDER.